Figure 1:
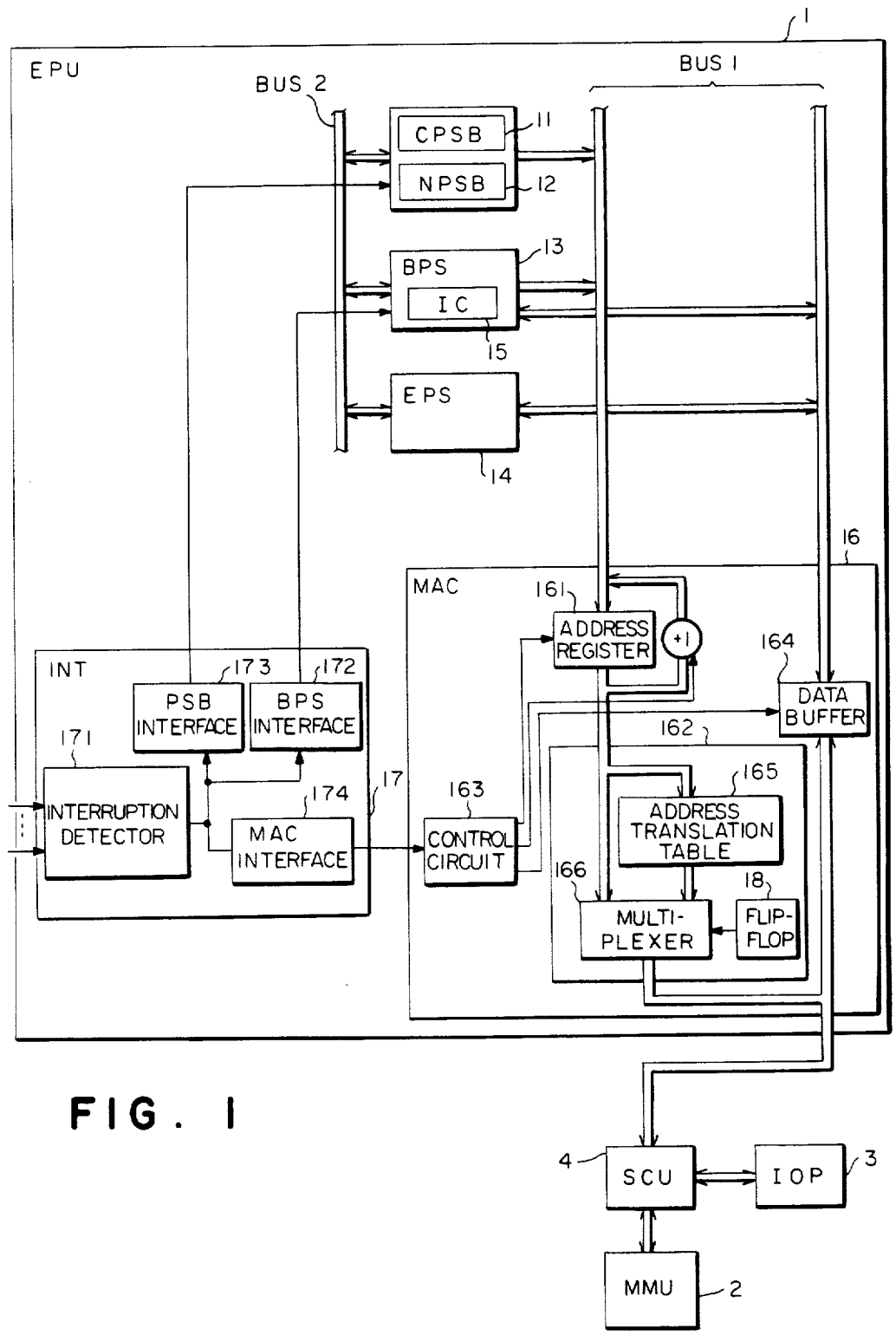

United States Patent [19]
Matsumoto

[11] Patent Number: 4,816,992
[45] Date of Patent: Mar. 28, 1989

[54] METHOD OF OPERATING A DATA PROCESSING SYSTEM IN RESPONSE TO AN INTERRUPT

[75] Inventor: Hajime Matsumoto, Tokyo, Japan
[73] Assignee: Nec Corporation, Tokyo, Japan
[21] Appl. No.: 877,763
[22] Filed: Jun. 24, 1986

[30] Foreign Application Priority Data

Jun. 27, 1985 [JP] Japan ............................ 60-140957

[51] Int. Cl.⁴ .............................................. G06F 9/40
[52] U.S. Cl. ................................................. 364/200
[58] Field of Search ... 364/200 MS File, 900 MS File

[56] References Cited

U.S. PATENT DOCUMENTS 3,789,365 1/1974 Jen et al. ............................. 364/200
4,228,495 10/1980 Burnhard et al. ................... 364/200

OTHER PUBLICATIONS

"IBM System/370 Extended Architecture-Principles of Operation", Chapter 2-Organization, Chapter 3-Storage, and Chapter 6-Interruptions, Mar. 1983, pp. 2-1 to 2-3, 3-37, to 3-44, and 6-1 to 6-8.

"NEC System 1000 General Description", Chapter 2, NEC Corporation, 1982, pp. 2-12 to 2-13, 2-35 to 2-42.

Primary Examiner—David Y. Eng
Attorney, Agent, or Firm—Foley & Lardner, Schwartz, Jeffery, Schwaab, Mack, Blumenthal & Evans

[57] ABSTRACT

A data processing system has a main memory unit (MMU) and an execution processing unit (EPU). The performance of the EPU is enhanced during interrupt processing by providing a basic processor status (BPS) storage and an extended processor status (EPS) storage. The status of the EPU is divided into the BPS and EPS, the BPS containing the contents of a general register that are frequently stored during interrupt processing, and the EPS containing the contents of registers infrequency stored during interrupt processing. The status of the EPU can be saved at any desired address location of the MMU designated by current and new processor status block (PSB) pointers that can be programmably altered. In addition, the address designated by the current and new PSB pointers can be set as logical or absolute addresses.

1 Claim, 4 Drawing Sheets

METHOD OF OPERATING A DATA PROCESSING SYSTEM IN RESPONSE TO AN INTERRUPT

BACKGROUND OF THE INVENTION

This invention relates to an interruption mechanism for a data processing system.

Such an interruption mechanism is proposed in a publication entitled "IBM System/370 Extended Architecture-Principles of Operation", Chapter 2: pp. 2–3, March issue, 1983. In the proposed mechanism, a number of pairs of old-PSW (old-program status word) and new-PSW locations are assigned in a real storage. When an interruption occurs, previously determined addresses for designating the pair of new-PSW and old-PSW corresponding to the type of the interruption are selected by hardware. The current-PSW is then stored in the corresponding old-PSW location of the storage. The Central Processing Unit (CPU) fetches a new PSW from a storage location designated by the hardware followed by the execution of an interruption program is executed.

This system, however, presents a problem that the old and new PSW pair occupies the fixed locations in the storage. As a result, an address change tends to become difficult. Another difficulty caused by the system is that since only the above-mentioned pairs of old and new PSW's can be saved and reloaded by hardware and the area of their storage locations cannot be changed, software must be used for saving and reloading data of a CPU status other than PSW's, for instance, the contents of a general register to and from a different location of the storage.

SUMMARY OF THE INVENTION

One object of the invention is, therefore, to provide an interruption mechanism for permitting an increase in the utilization of a memory to improve the performance of an execution processing unit (referred to as an EPU hereinafter).

Another object of the invention is to provide an interruption mechanism for permitting status data of the EPU to be saved at arbitrary locations of the memory.

Further object of the invention is to provide an interruption mechanism for permitting status data of the EPU other than PSW's to be saved and reloaded by hardware.

According to one aspect of the invention, there is provided an interruption mechanism which comprises: a memory unit (MMU) and an EPU; the EPU including a basic processor status (BPS) storage, an extended processor status (EPS) storage, current and new processor status block (PSB) pointer storages, and an interruption control section (INT). Following the acceptance of interruption request the interruption mechanism is sequentially operated by the steps which comprises:

a first step, under the control of INT, for saving BPS from the BPS pointer storage to a location of the memory addressed by the current PSB pointer from the current PSB pointer storage, a second step for loading data stored at the location addressed by the new PSB pointer stored in the new PSB pointer storage into the BPS storage, and a third step for executing interruption program, a fourth step, under control of said INT, for saving BPS from the BPS storage into the location of the MMU addressed by a new PSB pointer stored in the new PSB pointer storage, a fifth step for reloading into the BPS storage the data saved at the location of the memory addressed by the current PSB pointer stored in the current PSB pointer storage, and a sixth step for continuing interrupted program.

Figure 4A:
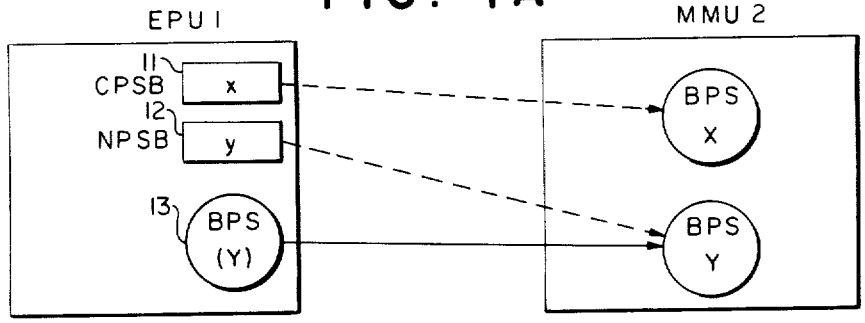
Figure 4B:
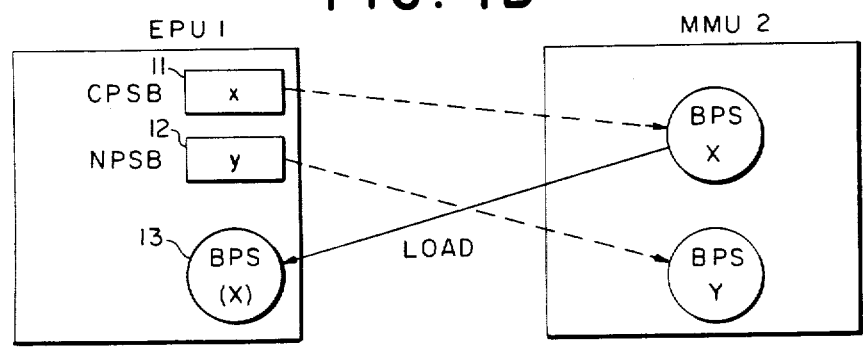
Figure 5A:
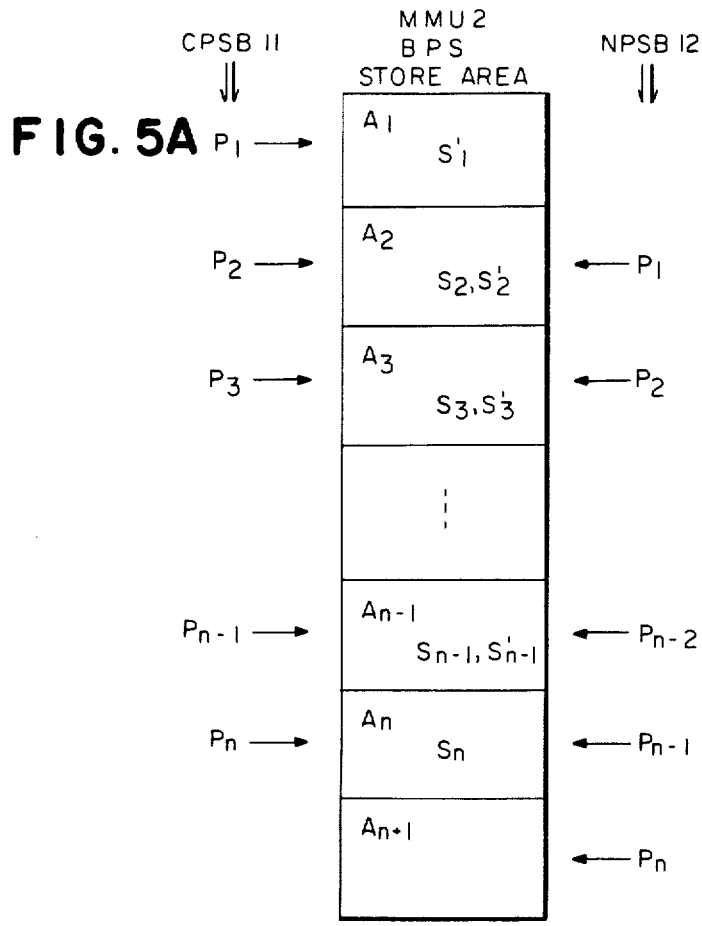
Figure 5B:
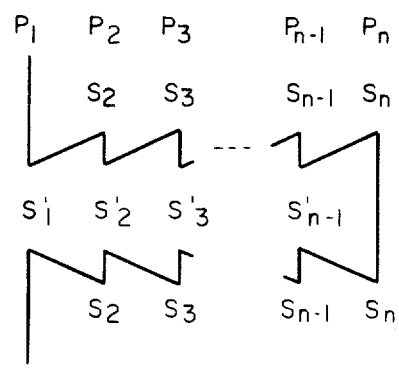

The invention will be described in detail by way of an example with reference to the accompanying drawings in which:

FIG. 1 is an example of a data processing system incorporating the mechanism of the invention, FIGS. 2A, 2B, 3, 4A and 4B are diagrams for illustrating an embodiment of the invention, FIGS. 5A and 5B are diagrams for describing multiple interruptions according to the invention.

In the drawings, identical numerals denote identical structural elements.

Referring to FIG. 1, a data processing system incorporating the interruption mechanism of the invention is composed of an EPU 1, a main memory unit (MMU) 2, an input/output processor (IOP) 3, and a system control unit (SCU) 4. For the functions of these and others, refer to a publication entitled "NEC System 1000 General Description", Chapter 2: pp. 12, 13 and 35 to 42, published in 1982 by NEC Corporation. Both the EPU 1 and the IOP 3 gain access to the MMU 2 through the SCU 4. The EPU 1 comprises a current PSB pointer storage 11 for storing the current PSB pointer, a new PSB pointer storage 12 for storing a new PSB pointer, a BPS storage 13, an EPS storage 14, a memory access control part (MAC) 16, and an interruption control part (INT) 17. The "BPS" stored in the BPS storage 13 refers to the status of the EPU 1 to be saved and loaded, under hardware control. This status consists of a PSW containing the contents of an instruction counter (IC) 15, an interruption status word, a timer register, an instruction execution number counter, and a scalar register having 32 words of 0 to 31. Nos. 0 to 31 of the scalar register are used mainly as a base register and an index register.

The "EPS" stored in the EPS part 14 refers to the status of the EPU 1 to be saved and reloaded under control of other than hardware, for example, by software. This status consists of 96 words of from 32 to 127 in the scalar register and a number of registers for providing the vector function, i.e., a vector mask register, a vector instruction execution number counter, and a vector register of 10,240 words.

The status of the EPU 1 is, as above-stated, divided into the BPS and the EPS. The reason is as follows:

An EPU such as a vector processor has a large-capacity vector register to perform the high-speed processing of vector data. The EPU 1 performs the execution of a number of programs including a vector operation program and control programs such as input/output and interruption programs. Such control programs can be executed without using the above-mentioned vector register. For this reason, at the time of interruption, saving and reloading operation of the contents of the vector register by hardware does not contribute to improvement in the utilization of the MMU and the increase in the performance of the EPU. If only the PSW's are saved and reloaded under hardware control, then software control must be frequently used for saving and reloading, resulting in the lowering of the performance of the whole system.

The present invention therefore has a feature that the contents of a base register, an index register, and a general register controlled according to the above-mentioned control program are contained in the base processor status as PSW's, and are to be saved and reloaded under hardware control, and on the other hand, the contents of the vector register are contained in the EPS to be saved and reloaded under software control. Thus, more effective use of the MMU and improvement in the performance of the EPU 1 can be attained.

The current PSB pointer storage 11, the new PSB pointer storage 12, the BPS storage 13, and the PS storage 14 are interconnected through the bus 2. The current and new PSB pointers in the storages 11 and 12, respectively, are changeable under the software control through the storage 13. The current and new PSB pointers and the BPS are applied through the bus 1 to the MAC 16 as addresses by which the MMU 2 is accessible. The BPS and EPS are supplied through the bus 1 to the MAC 16 as data for which the MMU 2 is accessible as well.

The INT 17 comprises an interruption signal detector 171, a BPS interface 172, a PSB interface 173, and an MAC interface 174, and performes the control of saving and reloading BPS.

In response to an interruption, the interruption detector 171 detects it and generates detection signal. On receiving the signal, the PSB interface 173 outputs instruction signal to the current PSB pointer storage 11. The current PSB pointer, which is a block start address for saving the BPS or current PSB pointer, is then sent through the bus 1 to the MAC 16. The detection signal is also applied to the BPS interface 172, from which an instruction signal is supplied to the BPS storage 13. Then the BPS is sent through the bus 1 to the MAC 16.

The INT 17 outputs instruction signal through the MAC interface 174 to the MAC 16 to do a specified access action.

The MAC 16 comprises an address register 161 storing addresses by which successive areas are accessible, a bidirectional first-in first-out (FIFO) data buffer 164 for compensating for different address or data rate between the SCU 4 and the EPU 1, a control circuit 163 for controlling the address register 161 and the data buffer 164, and an address translation circuit 162. The address translation circuit 162 comprises an address translation table 165, a multiplexer 166 for selecting either output of the address translation table 165 or output of the address resister 161, and a flip-flop 18 for executing the selection instruction from the multiplexer 166.

Upon receipt of an instruction from the MAC interface 174, the control circuit 163 of the MAC 16 applies control signals to the address register 161 and the data buffer 164, respectively. The current PSB pointer is sent from the address register 161 through the address translation circuit 162 and the SCU 4 to the MMU 2. On the other hand, all the BPS pointers are transmitted through the bus 1, the MAC 16 and the SCU 4 to the MMU 2 to be saved therein at the location addressed by the current PSB pointer. Following completion of this saving operation, a new PSB pointer is stored in the address register 161 of the MAC 16 through the bus 1. Then the data stored at the block of the MMU 2 addressed by this new PSB pointer is transmitted through the SCU 4, the data buffer 164 and the bus 1 and loaded in the BPS storage 13.

When the interruption has finished, the interruption detector 171 of the INT 17 applies an interruption finish (detected by software) signal through the PSB interface 173 to the new PSB pointer storage 12. In response to the interruption finish signal a new PSB pointer is sent through the bus 1 to the address register 161 of the MAC 16. The new PSB pointer is used a starting address of the block for resumption processing. In parallel to this, the BPS storage 13, in response to interruption finish signal supplied through the BPS interface 172 and the BUS 2, outputs all BPS's which are transmitted through the bus 1 and the SCU 4 and stored in the MMU 2. Following this storing operating, the current PSB pointer is stored in the address register 161 of the MAC 16 through the bus 1, and transmitted through the address translation circuit 162 and the SCU 4 to the MMU 2. Then data saved at the block of the MMU 2 designated by this current PSB pointer is read and transmitted to the BPS storage 13 through the SCU 4 and the data buffer 164. Similarly, according to software instruction, the MAC 16 controls the saving and reloading of EPS' contents.

Next, an example of the mode of interruption action according to the invention is described in detail.

Figure 2A:
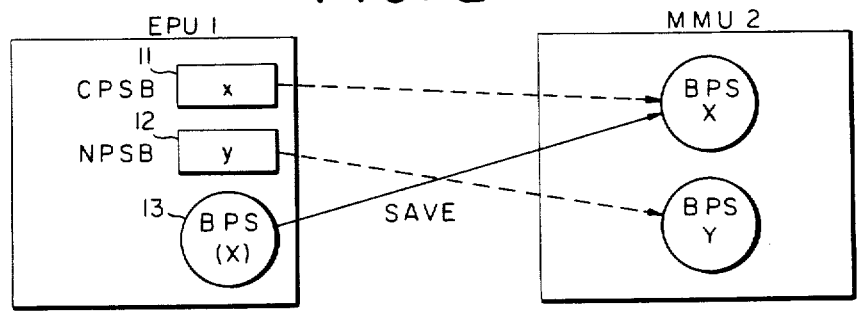

Referring to FIG. 2A, the current and new PSB pointer storages 11, and 12 holds the head addresses 'x' and 'y' of blocks 'X' and 'Y' assigned as current and new PSB locations in the MMU 2, respectively. In general, the head address 'y' is obtained as a sum of the head address 'x' and the size of the block, $\alpha$.

When an interruption request is accepted, the MAC 16 of the EPU 1, under the control of the INT 17, operates so that the BPS is transmitted from the EPU 1 to the MMU 2 and saved at the block 'X' designated by the address 'x' as the current PSB pointer, in sequence with the address 'x' put at head (see FIGS. 1 and 2A).

Figure 2B:
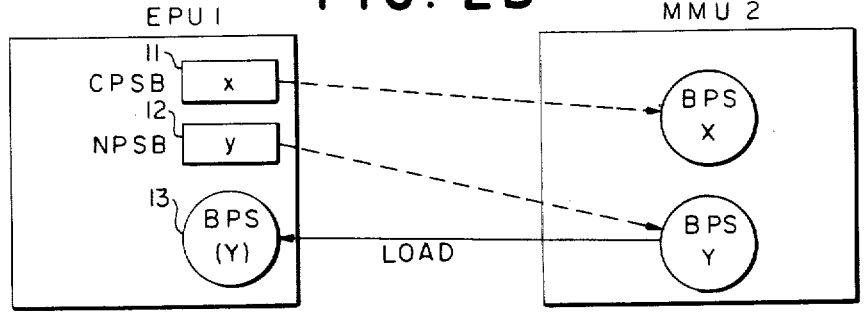

In addition, referring to FIGS. 1 and 2B, the MAC 16 operates to load the BPS in the BPS storage 13 of the EPU 1, in the sequence of storing the head of it as the first at the block 'Y' in the MMU 2 designated by the address 'y' representing the new PSB pointer. Once the loading has been completed, the EPU 1 reads out the start address of an interruption program stored at the address of the MMU 2. The address of the MMU 2 is designated by the contents of IC 15 in the BPS storage 13 as above-stated. The EPU 1 executes the interruption program by reading the start address.

Figure 3:
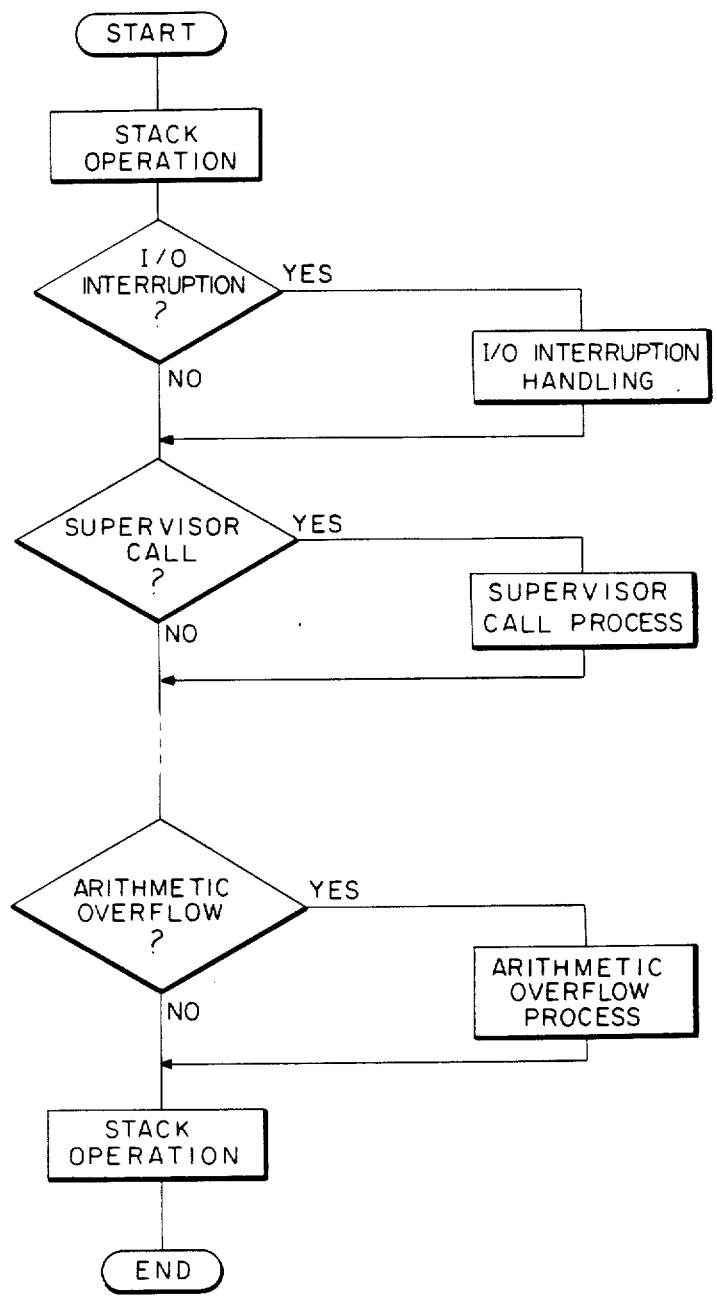

Referring to FIG. 3, the interruption program is executed as follows:

Firstly, for later interruption, the EPU 1 executes a stack operation, an addition of $\alpha$ to current and new PSB pointers, respectively. Then the EPU 1 checks sequentially on cause flags included in the BPS saved in the MMU 2, and executes suitable processing for interruption causes. Further, after completion of other necessary processings, the EPU 1 executes another stack operation, i.e., a subtraction of $\alpha$ from the current and new PSB pointers, respectively.

When the interruption handling program shown in FIG. 3 has been completed, it is transmitted by software to the INT 17. Referring to FIGS. 1 and 4A, under the control of the INT 17, the MAC 16 operates to cause the EPU 1 to supply new PSB pointer or address 'y' to the MMU 2 through the SCU 4, and transmits the BPS through the SCU 4 to the MMU 2. The BPS's are stored at the location designated by the address 'y'.

As illustrated in FIGS. 1 and 4B, the MAC 16 controls so that the current PSB pointer of the address 'x' is applied to the MMU 2 through the SCU 4, and the BPS is reloaded from the location of the MMU 2 designated with the address 'x' onto the BPS storage 13 of the EPU 1.

Once this reloading has finished, the EPU 1 resumes the interrupted program, that is, the contents of IC 15 which originally had been stored in the BPS storage 13, and during interruption, has been saved at the specific location of the MMU 2.

Detailed description of multiple interruption processing in accordance with invention will be given next.

Referring to FIG. 5A, the MMU 2 is provided a stack consisting of a plurality of successive storage blocks of the BPS.

Now, it is assumed that $P_i$ (i=1, 2, ..., n) is a program running on the EPU 1, that $S_i$ (i=1, 2, ..., n) is initial BPS values of program $P_i$, that $S'_i$ (i=1, 2, ..., n) is BPS values during interruption to the program $P_i$, and that $A_i$ (i=1, 2, ..., n) is successive blocks in the MMU 2.

Referring to FIGS. 1 and 5A, when the program $P_i$ is running, the current PSB pointer designates the block $A_i$ in the MMU 2 and the new PSB pointer designates the block $A_{i+1}$. When the program $P_i$ is interrupted and, instead the interruption program $P_{i+1}$ is running, as described above, a BPS S' of the program $P_i$ is transmitted from the EPU 1 to the MMU 2 and saved at the block $A_i$ of the MMU 2, and the initial BPS values of program $P_{i+1}$, that is $S_{i+1}$, are loaded from the block $A_{i+1}$ of the MMU 2 into the PBS storage 13 of the EPU 1. The interruption program $P_{i+1}$ then starts running. Current and new PSB pointers are updated by the stack operation, as described with reference to FIG. 3, so that the current PSB pointer designated the block $A_{i+1}$ and the new PSB pointer designates the block $A_{i+2}$. Also, before return from the program $P_{i+1}$ to the program $P_i$, the stack operation is performed so that the current PSB pointer designates the block $A_i$, and the new PSB pointer designated the block $A_{i+1}$. Thus, the initial BPS values of the program $P_{i+1}$, $S_{i+1}$ is transmitted from the PSB pointer storage 13 of the EPU 1 to the MMU 2 and saved at the block $A_{i+1}$ of the MMU 2. Then the BPS S' on interruption to the program $P_i$, is fetched from the block $A_i$ of the MMU 2, and reloaded in the BPS storage 13 of the EPU 1, and the program $P_i$ resumes from the point when it was interrupted. When the area of the block $A_i$ is fixed, the updating of the current, and new PSB pointers is achieved by merely the addition and subtraction of a certain value, such as α, in the above-mentioned example. Furthermore, the saving and reloading of the EPS are performed under software control.

In the example of system shown in FIG. 1, the flip-flop (F/F) 18 is set and reset by the software. While the F/F 18 is reset, addresses determined by the current and new PSB pointers are used as absolute addresses. On the other hand, when the F/F 18 is in the set position, they are used as logical addresses. At the start-up of the EPU 1 system with a logical/absolute address translation table in the MMU 2, it is necessary that the table itself is loaded in the MMU 2 from an external memory such as a disk medium, following the use of I/O instruction. Consequently, the F/F 18 is provided for permitting interruption due to the I/O instruction to be processed also when the MMU 2 has not such an address table. In other words, at the time of start-up of the system with the F/F being in the reset position, initial set values including the PSW are stored at a certain block. Under direction of the head address of the block by the current PSB pointer, an interruption signal is applied to the INT 17 from the exterior. In response to this interruption signal, initial values including PSW's are loaded in the BPS storage 13 of the EPU 1 from the blocks of the MMU 2 designated by the current PSB pointer. Together with this, other information such as address translation table is loaded from an external disk in the MMU 2 following I/O instruction, and thus the system starts up. After the start-up of the system, it is the best way to manage the overall area of the MMU 2 by the address translation mechanism. For this reason, the F/F 18 is set according to program, and the current and new PBS pointers can be used for access as logical addresses.

In this way, at the point of interruption, the status of the EPU 1 is saved at the blocks in the MMU 2 designated by the current and new PSB pointers alterable according to program, and loaded from there. As a result, since the status of the EPU 1 can be saved in arbitrary address of the MMU 2, the EPU 1 permits the software to offer a highly versatile interruption processing mechanism.

The status of the EPU is divided into the BPS and the EPS, the BPS containing PSW's and the contents of general register which are frequently to be saved and reloaded, and the EPS containing those which are not frequently to be saved and reloaded, such as the contents of vector register. The invention limits the object to be saved and reloaded by hardware only to the basic processor status and thus contributes to more effective use of the MMU and improvement in the performance of the EPU.

What is claimed is:

1. A method of operating a data processing system in response to an interrupt request, said data processing system comprising an execution processing unit (EPU) and a memory unit (MMU), said EPU including a basic processor status (BPS) storage for storing first data to be saved and reloaded, current and new processor status block (PSB) pointer storages for storing current and new PSB pointers, respectively, said pointers addressing locations in said memory unit, and an interruption control unit (INT), said method comprising the steps of:

(a) saving under control of said INT and in response to said interrupt request, said first data stored in said BPS storage to a first location of said MMU addressed by said current PSB pointer stored in said current PSB pointer storage;

(b) loading second data stored at a second location of said MMU addressed by said new PSB pointer stored in said new PSB pointer storage into said BPS storage, said second data corresponding to an interruption program; and (c) executing said interruption program;

(d) upon completion of said interruption program saving, under control of said INT, said second data stored in said BPS storage into said second location of said MMU addressed by said new PSB pointer stored in said new PSB pointer storage;

(e) reloading into said BPS storage said first data saved at said first location of said MMU addressed by said current PSB pointer stored in said current PSB pointer storage;

(f) continuing execution of said interrupted program;

(g) prior to completion of execution of said interruption program, receiving another interrupt request;

(h) updating, by a first stack operation, said current and new PSB pointers such that said current PSB pointer addresses said second location in said MMU and said new PSB pointer addresses a third location of said MMU, said third location storing third data corresponding to another interruption program;

(i) in response to said another interrupt request, and under control to said INT, saving said second data stored in said PBS storage to said second location of said MMU addressed by said current PSB pointers stored in said current PSB pointer storage;

(j) loading said third data stored at said third location of said MMU addressed by said new PSB pointer stored in said new PSB pointer storage into said BPS storage;

(k) executing said another interruption program;

(l) after step (k), saving, under control of said INT, said third data stored in said BPS storage into said third location of said MMU addressed by said new PSB pointer stored in said new PSB pointer storage;

(m) reloading into said BPS storage said second data stored in said second location of said MMU addressed by said current PSB pointer stored in said current PSB pointer storage;

(n) updating, by a second stack operation, said current and new PSB pointer such that said current PSB pointer addresses said first location in said MMU and said new PSB pointer addresses said second location of said MMU; and (o) continuing execution of said interrupted interruption program.

* * * * *